May 2, 1967 — H. REHDER — 3,316,759
APPARATUS FOR MEASURING FLEXURE OF A ROTATING OBJECT
Filed Aug. 4, 1964 — 2 Sheets-Sheet 1

Inventor: Hans Rehder
By Spencer & Kaye
ATTORNEYS

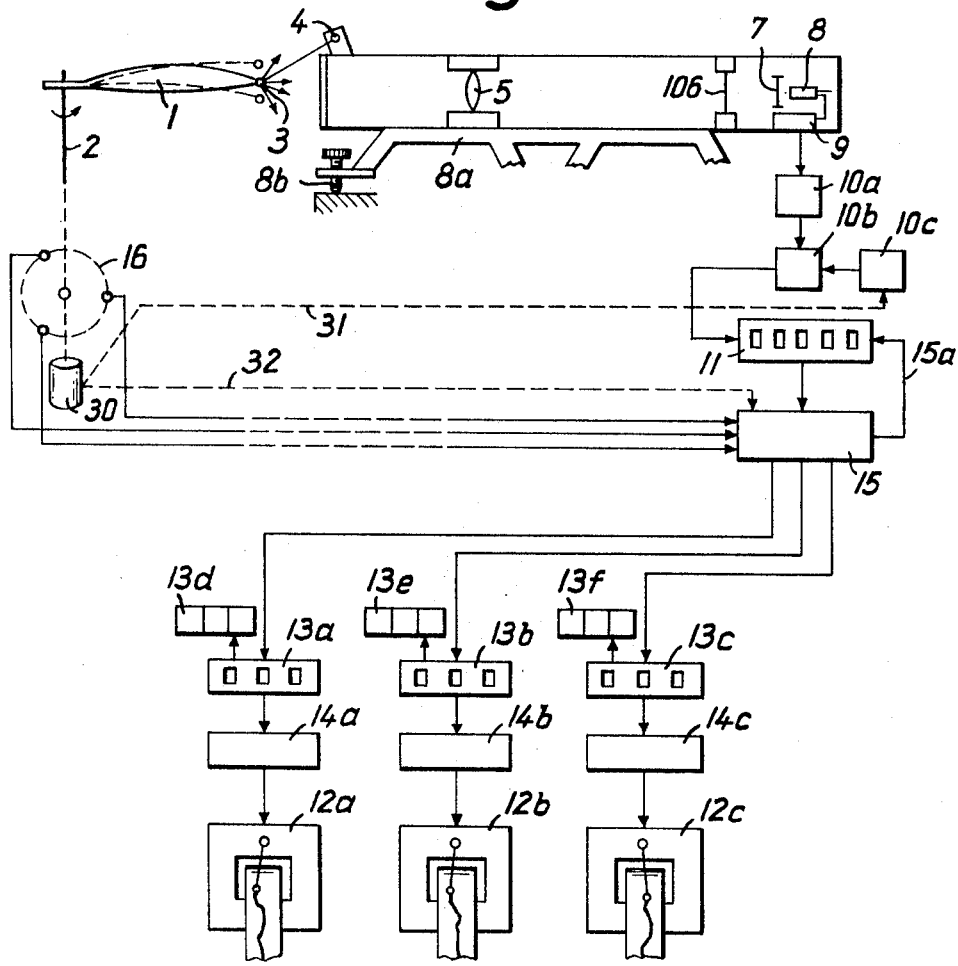
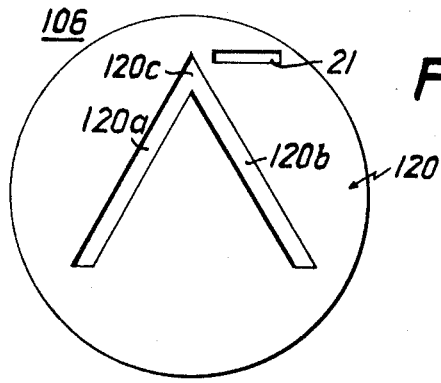
Fig. 3
Fig. 4

United States Patent Office 3,316,759
Patented May 2, 1967

3,316,759
APPARATUS FOR MEASURING FLEXURE OF
A ROTATING OBJECT
Hans Rehder, Frankfurt am Main, Germany, assignor to
Licentia Patent-Verwaltungs-G.m.b.H., Frankfurt am
Main, Germany
Filed Aug. 4, 1964, Ser. No. 387,379
Claims priority, application Germany, Aug. 9, 1963,
L 45,565
16 Claims. (Cl. 73—147)

The present invention relates to a measuring arrangement and represents an improvement of the invention disclosed and claimed in my co-pending application Ser. No. 275,660, filed Apr. 25, 1963, now Patent No. 3,282,-093.

The invention described in the above-mentioned application relates to an arrangement for measuring the distance which a point on a rotating object is displaced, in a direction generally parallel to the axis about which the object rotates, during such rotation. Such an arrangement can be used for measuring the extent to which the blades of a rotating propeller or helicopter rotor flex during rotation. It will be appreciated that such a measurement should be taken as accurately as possible without, however, it being necessary physically or mechanically to touch the rotating blades.

The invention described in the above-mentioned application was based on the following considerations:

If the movement of an object, or the deflection of an object from its true path, is to be measured, and if the object itself is not readily accessible or physically, i.e., mechanically engageable, such measurement can be carried out by optic means. For example, the object whose movement is to be measured may be provided with an aperture that can be illuminated, which aperture can, by means of an optical system, be reproduced on a groundglass or opaque disc, or on a photographic plate, so that the image of the aperture can be measured and analyzed. Such disc or photographic plate may be provided with a measuring raster of known size, or a photograph of the aperture can be developed together with the representation of such a raster. While this allows accurate measurements to be obtained without the object itself being touched, one drawback of, for example, the photographic method is that the result is not immediately available. Another drawback is that in the case of considerable irregular deflection, it is expensive to carry out the repeated measurements. On the other hand, if the measurement is to be read visually, the speed with which the eye can follow the readings is limited, to say nothing of errors introduced by the human operator.

Constant efforts had, therefore, been made to find ways to increase the speed with which the measurement is taken, to obtain an output value which changes in conformity with the movement of the object whose movement is being measured, and to eliminate human errors. One such system uses an aligned row of small photocells which serve as a scale, the arrangement being such that the object whose movement is to be measured is positioned between the photocells and a light source. The number of illuminated photocells are counted electronically, or an analog value is formed in a suitable manner. Such an arrangement is described in the Russian periodical "Metallurgy," No. 1, pages 23 to 25, Moscow 1960, in an article entitled, "Automatic Measuring Apparatus for Rolled Stock," by Gutnikow and Tschuso. While the system there described can operate at any desired speed (limited only by the time lag inherent in the photoelectric cells), the resolution, i.e., the accuracy, is limited by the mechanical size of the cells, since each cell constitutes the smallest unit of measurement.

There exists another scanning system in which the position of objects which themselves are luminous or illuminated is determined by means of photocells forming part of an optical rotary mirror system. The difficulty with such a system is that the object whose movement is to be measured has to be within the measuring plane throughout several scanning periods of the mirror. If, however, the object being measured moves very rapidly, as is the case, for instance, with the tip of a helicopter rotor, the usual scanning frequency of a rotating mirror system, which is, for example, of the order of 300 c.p.s., is not high enough. Similar difficulties arise if the object is to be scanned by a television camera.

Accordingly, the above-mentioned application disclosed an arrangement which not only allowed the measurement to be carried out within any desired short time interval, but which also yielded the result of the measurement with practically any desired degree of accuracy in digital form, this being considered a substantial advantage in view of the fact that the result will generally be processed or recorded by electronic means, e.g., storage devices, indication by means of luminous figures, graphic recorders, punched cards or tapes, and the like. Therefore, the invention disclosed in the above-mentioned application resided, in an arrangement for measuring the distance which a point of a rotating object is displaced, in a direction generally parallel to the axis about which the object rotates, during such rotation, which arrangement comprised basically, a reflection ball attached to a given point of the object, means for illuminating the ball to produce an image line which is at right angles to the axis of rotation, a measuring raster arranged in the path of the image line so as to be swept by the latter during rotation of the object, this raster having raster lines which extend transversely to the image line that sweeps the raster and which are of different lengths so that the number of raster lines swept by the image line depends upon how far the point is displaced in the direction parallel to the axis of rotation, and means, including a photosensitive device, responsive to the number of raster lines swept by the image lines for producing a digital output, in the form of counted pulses, which is related to the number of raster lines swept and hence to the distance which the point is displaced in the above-mentioned parallel direction. Such an arrangement was found to be suited for use as a dynamic propeller or helicopter rotor testing arrangement that allowed a measurement to be made of how much the blades of the rotating propeller or rotor were flexed during rotation.

The photosensive means of the above-described device were found to be relatively sensitive, particularly when the system was used in sunlight, in which case the strong light adversely affected the photosensitive device. The adverse effect was found to be dependent on the size of the raster through which light could pass, i.e., the larger the raster, the greater was the disturbing effect which the ambient sunlight had on the device.

It is, therefore, the primary object of the present invention to provide an arrangement which overcomes the mentioned drawbacks of the arrangement described in the earlier application, namely, to provide an arrangement having a greater signal-to-noise ratio, even when used in bright sun light.

It was also found that, in the arrangement described in the earlier application, the amplitude of the counting pulses themselves changed because the maximum sensitivity of the photosensitive device ran along the optical axis of the system, and inasmuch as the diffusion of the light, needed for the photoelectric pick-up, acted most extensively in axial direction. Accordingly, it is further the object of the present invention to provide an improved arrangement in which the effects of amplitude changes of the counting pulses are eliminated.

Yet another drawback of the arrangement disclosed in the earlier application was that the focussing was relatively critical, in that the reproduction of the luminous spot could not exceed the width between two raster lines, so that whenever a blade of different length was measured, the system had to be re-focussed. Accordingly, it is a still further object of the present invention to provide an improved arrangement whose focussing is not critical.

With the above objects in view, the present invention relates, essentially, to an arrangement capable of carrying out the measurement effected by the arrangement disclosed in the earlier application, namely, an arrangement for measuring the distance which a point on the object is, during rotation, displaced in a direction generally parallel to the axis about which the object rotates. The arrangement according to the present invention comprises, as did the previously disclosed arrangement, a reflection ball attached to the point of the object and means for illuminating the ball to produce an image line which is at right angles to the axis of rotation. However, in lieu of the raster, there are provided masking means which are arranged in the path of the image line so as to be swept by the latter during rotation of the object. The masking means are provided with two light-passing slots which, in a direction transverse to the sweeping image line, are inclined with respect to each other so that the time interval between the instant at which the image line sweeps across the first of the slots and the instant at which the image line sweeps across the second of the slots depends upon how far the point in question is displaced in the direction parallel to the axis of rotation. Furthermore, means are provided for obtaining a measurement of the time interval and hence of the distance which the point in question is displaced in a direction parallel to the axis of rotation.

According to a preferred embodiment, the means for obtaining the measurement comprise a photosensitive device, a gate circuit, a pulse generator connected to an input of the gate circuit, a counter connected to the output of the gate circuit for counting the number of pulses passed by the gate circuit, and means connecting the photosensitive device to the gate circuit for opening the latter when the image line sweeps across the second slot.

In practice, the masking means are provided with a generally V-shaped light-passing opening whose apex points in a direction at right angles to the sweeping image line, the legs of the V constituting the first and second slots, respectively.

The objects of the present invention further include the provision of means by which fluctuations in the rotational speed of the rotating object are suitably compensated for and, accordingly, the present invention further resides in the provision of such means.

Additional objects and advantages of the present invention will become apparent upon consideration of the following description when taken in conjunction with the accompanying drawings in which:

FIGURE 3 is a partly structural and partly schematic illustration of an arrangement in accordance with the present invention.

FIGURE 4 shows a masking means such as may be used in the arrangement according to FIGURE 3.

Figure 1:
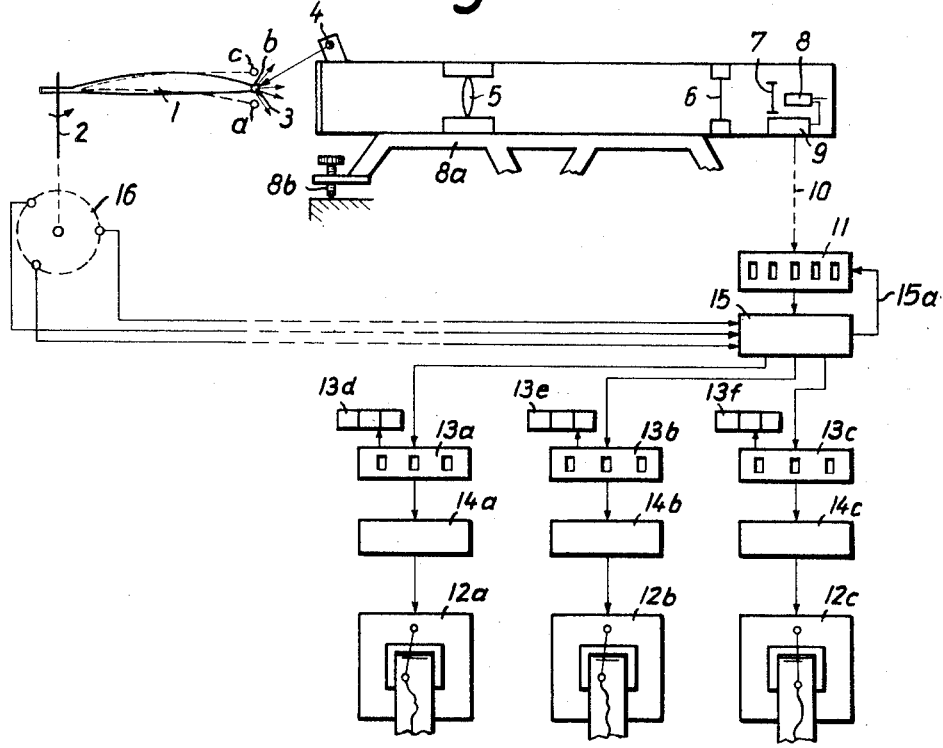
FIGURE 1 is a partly structural and partly schematic illustration of the arrangement disclosed in the above-mentioned application.

For purposes of explanation, there will first be described the arrangement disclosed in the above-mentioned application, with reference being made to FIGURES 1 and 2. Referring first to FIGURE 1 in particular, the same shows a helicopter rotor blade 1 which may be one of three such blades of a rotor which is rotated about an axis 2. The object of the measuring system is to determine the distance which the tip of the blade moves vertically (as viewed in FIGURE 1) in a direction parallel to the axis of rotation 2, as a function of the rotational speed and pitch of the blade. The tip of the blade 1 carries a reflecting ball 3. Such ball may, for example, be a sphere of polished glass which has aluminum deposited thereon. The remainder of the surface of the blade is covered with a non-reflecting coating, such as a dull black lacquer. The ball 3 has a diameter of, for example, several millimeters and is carried by the blade at a point which lies on the pitch axis of the blade, i.e., the axis about which the blade rotates when its pitch is changed.

The measuring apparatus proper comprises an optical system, preferably one which is responsive to ultra-violet light. The optical system incorporates a very high pressure mercury vapor lamp 4, a lens (or lens system) 5 which passes ultra-violet light and which is so configured as to project an image onto a flat focussing plane, a measuring grid or raster 6 (FIGURE 2) carried by a pane of quartz glass which itself passes ultra-violet light, an ultra-violet daylight filter 7, such as "Uviol," and a photosensitive device such as a photomultiplier 8. The optical system is mounted on a traverse 8a in the manner of a telescope so that the ball 3 carried at the tip of the blade and illuminated by the ultra-violet lamp 4 causes a horizontal image line to be reproduced on the measuring grid. The traverse, which carries the optical system, is equipped with an adjustment screw 8b. Depending on the flexure of the blades and hence on the position of the rotating blade tips, a greater or smaller number of raster lines will be swept by the image line, so that there will be a greater or smaller number of electrical pulses appearing at the output of the multiplier. The pulses are applied, via an impedance transformer 9 and a line 10 whose length is non-critical, to a counter 11. The measuring raster is so arranged that, for example, each millimeter of vertical movement of the blade tip will result in one or ten pulses for the counter. In order to obtain an independent reading for each blade, and so that these readings may be taken for all blades during the rotation of the rotor, the output of the counter 11 is connected to a gate circuit 15 which is controlled by a synchronous timer 16. The latter, shown in FIGURE 1 as being set up for a three-bladed rotor so that the triggering positions which are connected to the gate circuit 15 are angularly displaced by 120°, causes the gate circuit 15 to transfer the particular values appearing at the output of the counter 11 to the respective individual counters 13a, 13b, 13c, depending upon the position of the rotor so that each of the three individual counters 13a, 13b, 13c corresponds to one of the three rotor blades. After each such transfer, the counter 9 is reset to zero by the gate circuit 15, as indicated schematically by resetting line 15a. The three counters 13a, 13b, 13c have visual number indicators 13d, 13e, 13f, respectively, associated therewith so that a digital indication of the measuring result may be obtained. In practice, the indicators are so connected that their readings are not periodically reset, but remain visible and undergo a change only if the succeeding measurement changes.

The arrangement also includes three digital-to-analog converters 14a, 14b, 14c, connected to the outputs of the counters 13a, 13b, 13c, respectively, which converters have their outputs, in turn, connected to the inputs of three graphic recorders 12a, 12b, 12c, respectively.

Figure 2:
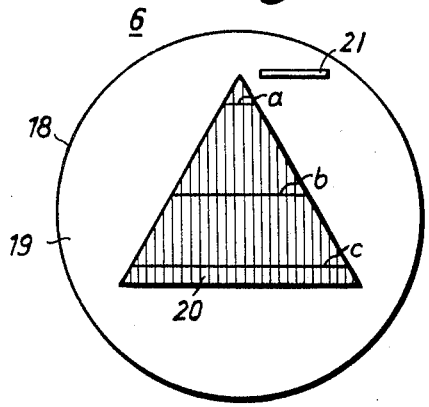
FIGURE 2 shows a raster such as may be used in the arrangement of FIGURE 1.

FIGURE 2 shows a measuring raster which may be used in a system according to the invention disclosed in the earlier application. The same comprises a housing 18 supporting a diaphragm 19 which carries a triangular line raster 20, there being, for example, 300 raster lines distributed over 30 centimeters. Also shown is a setting opening 21 for zeroing in the line raster.

As is apparent from FIGURE 2, the raster lines extend transversely, and preferably at substantially right angles, to the image line produced by the ball carried by the blade tip which moves past the optical system. The level of the image line with respect to the raster lines will depend on how much the blade flexes during rotation of the rotor and this, in turn, will determine the number of raster lines that are swept by the image line. FIGURE 1 shows the reflection ball as occupying three positions $a$, $b$ and $c$, which may, for example, be the positions occupied by the blade tips of a three-bladed rotor undergoing the test. The blade carrying the ball at position $a$ will produce the image line $a$ shown in FIGURE 2, the blade carrying the ball at point $b$ (i.e., the blade 1 shown in solid lines in FIGURE 1) will produce the image line $b$ of FIGURE 2, while the third blade will position its ball at $c$, thereby producing the image line $c$ of FIGURE 2. The image lines $a$, $b$, $c$, are shown as sweeping three, fifteen, and twenty-five raster lines, respectively, so that appropriate digital values will appear at the indicators 13$d$, 13$e$, and 13$f$.

The arrangement according to the present invention, shown in FIGURES 3 and 4, differs from the arrangement shown in FIGURES 1 and 2, as follows:

Instead of the measuring raster 6, there is provided a mask 106 which is provided with a light-passing V-shaped opening indicated generally at 120. This opening has two legs 120$a$ and 120$b$ meeting at an apex 120$c$ which points in a direction at right angles to the sweeping image line which, as viewed in FIGURE 4, will be horizontal, i.e., the V may point either up as viewed in FIGURE 4, or down.

It will be appreciated that the legs 120$a$, 120$b$, constitute two light-passing slots which, in a direction transverse to the sweeping image line, are inclined with respect to each other. Consequently, the time interval between the instant at which the image line sweeps across the first of the two slots and the instant at which the image line sweeps across the second of the two slots depends upon how far the point 3 is displaced in a direction parallel to the axis of rotation 2. This time interval will, of course, be zero, if the image line sweeps at or above the apex 120$c$.

The arrangement of FIGURES 3 and 4 differs from that of FIGURES 1 and 2 also in the manner in which the photosensitive device 8 is connected to the counter 11. The connection includes a bistable flip-flop 10$a$ connected to the output of the transformer 9, a gate circuit 10$b$, and a pulse generator 10$c$. The input of the counter 11 is connected to the output of the gate circuit 10$b$. The connection of the flip-flop 10$a$ is such that, when the first pulse applied to it—which occurs when the image line sweeps across the first of the slots 120$a$, 120$b$—the gate circuit 10$b$ is opened and when the next pulse is applied to it— which occurs when the image line sweeps across the second slot—the gate circuit 10$b$ is closed. Consequently, the number of pulses applied by the generator 10$c$ to the counter 11 will be proportional to the time interval between the instant the gate circuit 10$b$ is opened and the instant the gate circuit 10$b$ is closed. Therefore, the count reached by the counter 11 will be a measure of the duration of the time interval and, as explained above, of the position of the point 3.

The frequency of the generator 10$c$ is suitably selected to result in the desired accuracy. The generator may, for example, be crystal stabilized or a self-excited generator.

FIGURE 3 also shows mean interconnecting the means which rotate the object—these means being constituted, for example, by a drive motor 30—for compensating the measuring system for fluctuations in the rotational speed at which the object is driven. Such compensation may be obtained by making the pulse generator 10$c$ adjustable, and by providing connecting means 31 which synchronize the frequency of the pulse generator with the rotational speed, thereby preserving the accuracy of the measurement and eliminating any change in calibration resulting from a different rotational speed. Alternatively, the compensation may be effected by applying a correcting factor to the counter 15 whenever the rotational speed of the object differs from the nominal speed at which the dynamic balancing is to be carried out. Accordingly, a suitable connection 32 is provided between the driving means 30 and the counter 15; these means may, in practice, be constituted by digital or analog devices.

It will be understood that the above description of the present invention is susceptible to various modifications, changes, and adaptations, and the same are intended to be comprehended within the meaning and range of equivalents of the appended claims.

What is claimed is:

1. For use with a rotating object, an arrangement for measuring the distance which a point on the object is, during rotation, displaced in a direction generally parallel to the axis about which the object rotates, said arrangement comprising, in combination:
    (a) a reflection ball attached to said point of the object;
    (b) means for illuminating said ball to produce an image line which is at right angles to said axis of rotation;
    (c) masking means arranged in the path of the image line so as to be swept by the latter during rotation of the object, said masking means being provided with two light-passing slots which, in a direction transverse to the sweeping image line, are inclined with respect to each other so that the time interval between the instant at which the image line sweeps across the first of said slots and the instant at which the image line sweeps across the second of said slots depends upon how far said point is displaced in said direction parallel to said axis of rotation; and
    (d) means for obtaining a measurement of said time interval and hence a measurement of the distance which said point is displaced in said direction parallel to said axis of rotation.

2. An arrangement as defined in claim 1 wherein said masking means are provided with a generally V-shaped light-passing opening whose apex points in a direction at right angles to the sweeping image line, the legs of the V constituting said first and second slots, respectively.

3. An arrangement as defined in claim 1 wherein said means for obtaining the measurement comprise a photosensitive device, a gate circuit, a pulse generator connected to an input of said gate circuit, a counter connected to the output of said gate circuit for counting the number of pulses passed by said gate circuit, and means connecting said photosensitive device to said gate circuit for opening the latter when the image line sweeps across said first slot and for closing the gate circuit when said image line sweeps across said second slot.

4. An arrangement as defined in claim 3 wherein said means connecting said photosensitive device to said gate circuit comprise a bistable flip-flop circuit.

5. An arrangement as defined in claim 3, further comprising
    (e) means for rotating the object; and
    (f) means interconnecting said rotating means and said measuring means for compensating, in said measuring means, for fluctuations in the rotational speed with which said rotating means rotate the object.

6. An arrangement as defined in claim 5 wherein said frequency generator is adjustable and said interconnecting means (f) comprise means for synchronizing the frequency of said pulse generator with the rotational speed at which said rotating means rotate the object.

7. An arrangement as defined in claim 5 wherein said interconnecting means (f) comprise means responsive to the rotational speed of said rotating means for adjusting the count of said counter in conformity with the rotational speed.

8. An arrangement as defined in claim 3 wherein said means for obtaining the measurement further comprise means for indicating the output of said counter.

9. An arrangement as defined in claim 8 wherein there are a plurality of points on said object angularly distributed about the axis of rotation thereof, wherein there is a reflection ball at each of said points, wherein said means for indicating the output of said counter comprise a plurality of indicators each correlated with one of said points on each object, and wherein means are provided for connecting each respective indicator with said counter when the particular reflection ball with which such indicator is correlated produces an image line that sweeps said masking means.

10. An arrangement as defined in claim 9 wherein said connecting means comprise a rotary timer coacting with the object and producing an output signal when the ball at each particular point produces an image line which sweeps said masking means, and a gate interposed between said counter and said indicators for applying the result appearing at the counter to the proper indicator.

11. An arrangement as defined in claim 10 wherein said gate is connected to said counter for resetting the same after a result has been transferred to one of the indicators.

12. An arrangement as defined in claim 10 wherein each of said indicators comprises an individual counter for receiving the result from said counter connected to said photosensitive device, and an indicating device for indicating the contents in the respective individual counter.

13. An arrangement as defined in claim 12, further comprising a plurality of digital-to-analog converters each connected to a respective one of said individual counters for producing an analog value representing the result stored in such individual counter, and a plurality of recording devices each connected to a respective one of said converters.

14. An arrangement as defined in claim 9 wherein the object is a multiple-bladed element and wherein said ball is located at the tip of one of the blades.

15. An arrangement as defined in claim 14 wherein the element is of the variable-pitch type and wherein said ball is located on the pitch axis of the blade.

16. A dynamic propeller or rotor testing arrangement for measuring how much a blade of the rotating propeller or rotor is flexed during rotation, said arrangement comprising, in combination:
  (a) a reflection ball attached to the tip of the blade;
  (b) means for illuminating said ball to produce an image line which is at right angles to said axis of rotation;
  (c) masking means arranged in the path of the image line so as to be swept by the latter during rotation of the propeller or rotor, said masking means being provided with two light-passing slots which, in a direction transverse to the sweeping image line, are inclined with respect to each other so that the time interval between the instant at which the image line sweeps across the first of said slots and the instant at which the image line sweeps across the second of said slots depends upon how far the tip of said blade is displaced in said direction parallel to said axis of rotation; and
  (d) means for obtaining a measurement of said time interval and hence a measurement of the distance which the tip of the blade is displaced in said direction parallel to said axis of rotation.

References Cited by the Examiner

UNITED STATES PATENTS

| | | |
|---|---|---|
| 1,664,210 | 3/1928 | Hall. |
| 2,934,825 | 5/1960 | Braybrook et al. _____ 88—14 X |
| 2,960,908 | 11/1960 | Willits et al. _____ 73—147 X |
| 3,105,381 | 10/1963 | Collette _____ 73—71.3 X |
| 3,194,966 | 7/1965 | Hulett. |

FOREIGN PATENTS 1,086,997   8/1954   France.

RICHARD C. QUEISSER, *Primary Examiner.*

J. P. BEAUCHAMP, *Assistant Examiner.*